United States Patent
Meek et al.

(10) Patent No.: US 10,242,370 B2
(45) Date of Patent: Mar. 26, 2019

(54) ENFORCING COMPLIANCE WITH ADMINISTRATIVE REQUIREMENTS RELATING TO USING COMPUTING RESOURCES

(71) Applicant: CloudBolt Software Inc., Campbell, CA (US)

(72) Inventors: Taylor J. Meek, Portland, OR (US); Alexandre Augusto Ramos da Rocha, Rockville, MD (US)

(73) Assignee: CLOUDCOLT SOFTWARE INC., Campbell, CA (US)

( * ) Notice: Subject to any disclaimer, the term of this patent is extended or adjusted under 35 U.S.C. 154(b) by 217 days.

(21) Appl. No.: 15/253,024

(22) Filed: Aug. 31, 2016

(65) Prior Publication Data
US 2017/0345016 A1 Nov. 30, 2017

Related U.S. Application Data (60) Provisional application No. 62/341,747, filed on May 26, 2016.

(51) Int. Cl.
G06F 17/30 (2006.01)
G06Q 30/00 (2012.01)

(52) U.S. Cl.
CPC ..... G06Q 30/018 (2013.01); G06F 17/30864 (2013.01)

(58) Field of Classification Search
CPC .................................................. G06Q 30/018
See application file for complete search history.

(56) References Cited

U.S. PATENT DOCUMENTS

| | | |
|---|---|---|
| 8,495,356 B2 | 7/2013 | Ashok et al. |
| 2010/0235526 A1 | 9/2010 | Carter et al. |
| 2010/0235903 A1 | 9/2010 | Carter et al. |
| 2011/0010339 A1 | 1/2011 | Wipfel et al. |
| 2012/0173731 A1 | 7/2012 | Lin et al. |
| 2012/0239825 A1 | 9/2012 | Xia et al. |

(Continued)

FOREIGN PATENT DOCUMENTS

| | | | |
|---|---|---|---|
| CN | 102185927 A | | 9/2011 |
| WO | WO2013103989 | * | 7/2013 |

OTHER PUBLICATIONS

Badger, et al., "Cloud Computing Synopsis and Recommendations", NIST—National Institute of Standards and Technology, May 2012, p. 81.

(Continued)

*Primary Examiner* — Kambiz Zand
*Assistant Examiner* — Thanh H Le
(74) *Attorney, Agent, or Firm* — Morris & Kamlay LLP (57) ABSTRACT

Provided are examples of apparatus and methods which relate to enforcing compliance with one or more administrative requirements relating to using computing resources. In an example, one or more objects being used on one or more cloud computing platforms are identified with a computing device. Data describing the one or more objects is received. One or more rules restricting the use of the one or more objects is received. One or more violations of the one or more rules are searched for by comparing the received data to the rules. In response to identifying one or more violations, a response to the one or more violations is executed.

24 Claims, 3 Drawing Sheets

(56) References Cited

U.S. PATENT DOCUMENTS

| | | |
|---|---|---|
| 2012/0260228 A1 | 10/2012 | Mallick et al. |
| 2012/0278861 A1 | 11/2012 | Lu et al. |
| 2012/0330711 A1* | 12/2012 | Jain ................... G06F 9/5072 705/7.23 |
| 2013/0212553 A1* | 8/2013 | Balasubramanian .. G06Q 10/06 717/102 |
| 2014/0115161 A1 | 4/2014 | Agarwal et al. |

OTHER PUBLICATIONS

Cloudbolt Software, "Actions", http://docs.cloudbolt.io/advanced/orchestration-actions/actions.html#action-input-parameters, 2015, p. 1.

Cloudbolt Software, "Continuous Infrastructure Testing", http://docs.cloudbolt.io/advanced/continuous-infrastructure-testing/index.html, 2015, p. 1.

Cloudbolt Software, "Orchestration", http://docs.cloudbolt.io/advanced/orchestration-actions/index.html, 2015, p. 1.

Cloudbolt Software, "Order Form Customization", http://docs.cloudbolt.io/order-form-customization.html, 2015, p. 1.

Cloudbolt Software, "Service Catalog Overview/Capabilities", http://docs.cloudbolt.io/service-catalog/index.html, 2015, p. 1.

\* cited by examiner

ENFORCING COMPLIANCE WITH ADMINISTRATIVE REQUIREMENTS RELATING TO USING COMPUTING RESOURCES

CLAIM OF PRIORITY

The present Application for Patent claims priority to U.S. Provisional Patent Application No. 62/341,747 entitled "ENFORCING COMPLIANCE WITH ADMINISTRATIVE REQUIREMENTS RELATING TO USING COMPUTING RESOURCES", filed May 26, 2016, and assigned to the assignee hereof and hereby expressly incorporated by reference herein.

FIELD OF DISCLOSURE

This disclosure relates generally to electronics, and more specifically, but not exclusively, to methods and apparatus which relate to enforcing compliance with one or more administrative requirements relating to using computing resources.

BACKGROUND

Organizations, such corporations and government entities, often use cloud computing environments as a part of their information technology (IT) infrastructure. The organizations often lease computing resources, in the cloud computing environments, from a service provider. The computing resources are virtual and remote, thus the organizations' users do not sense a tangible presence of the computing resources. Accordingly, it is easy (and common) for a single user to implement a tremendous quantity of expensive computing resources without having an associated sense of the impact of their actions. As a result, these virtual and remote computing resources can be underused, overused, abused, or a combination thereof, by the organizations' users. This improper use of leased resources results in excess expense to the organization, as well as wasted resources and wasted energy.

SUMMARY

This summary provides a basic understanding of some aspects of the present teachings. This summary is not exhaustive in detail, and is neither intended to identify all critical features, nor intended to limit the scope of the claims.

Example methods and apparatus relating to enforcing compliance with one or more administrative requirements imposed on using cloud-computing are disclosed. An example method includes identifying, with a computing device, one or more objects being used on one or more cloud computing platforms. In an example, the identifying of the one or more objects further comprises: querying one or more respective cloud management platforms of the one or more cloud computing platforms for an identification of the one or more objects being used on the respective one or more cloud computing platforms, retrieving the identification of the one or more objects being used from a database storing a record of user activities, or a practicable combination thereof. The example method also includes receiving data describing the one or more objects. In an example, the receiving of the data further comprises: querying the one or more cloud computing platforms for the data, querying a database for the data (where the database is independent of the one or more cloud computing platforms), storing the data in the database, or a practicable combination thereof. In an example, the data describing the one or more objects includes: user-defined data, historical data, real-time data, one or more configuration details of a server, one or more configuration parameters for a workload, one or more configuration details of a virtual network, one or more configuration details of a virtual machine, one or more configuration details of an operating system, one or more configuration details of software, one or more configuration details of hardware, one or more configuration details of a cluster, one or more configuration details of a network, one or more details of a remote script, one or more details of a pod of containers, one or more details of a load balancer, or a practicable combination thereof. The example method also includes receiving one or more rules restricting the use of the one or more objects. In an example, the receiving of one or more rules further comprises: receiving a user-defined rule; receiving one or more descriptions of what one or more specific objects in the one or more objects should include, should not include, or a practicable combination thereof; receiving a rule checking for a permitted geographic location of a given workload, a prohibited geographic location of a given workload, or a practicable combination thereof receiving a rule checking for one or more known vulnerabilities; receiving a rule checking for a cost to implement one or more specific objects in the one or more objects; receiving a rule checking for a percentage of a license which has been used, a percentage of a license which has been not been used, or a practicable combination thereof; receiving a rule checking for a newer version of cloud management software; receiving a rule checking if a usage quota has been exceeded, the usage quota has not been exceeded, or a practicable combination thereof; receiving a rule checking for missing tags, present tags, or a practicable combination thereof; receiving a rule checking for compliance with one or more compliance parameters for a server; receiving a rule checking for compliance with one or more compliance parameters for a workload; or a practicable combination thereof. The example method also includes searching for one or more violations of the one or more rules by comparing the received data to the rules, and executing, in response to identifying one or more violations, a response to the one or more violations. In an example, the response comprises one or more of: a user-defined response; storing the data describing the one or more objects; changing one or more configurations of one or more computing resources; sending one or more text messages, e-mails, or a practicable combination thereof to a user; applying a patch; determining that a patch is not to be applied; moving a workload from the one or more cloud computing platforms to a different cloud computing platform; powering down of a virtual machine; powering up of a virtual machine; stopping execution of an action; or a practicable combination thereof.

In a further example, provided is a non-transitory computer-readable medium, including processor-executable instructions stored thereon. The processor-executable instructions can be configured to cause a processor to execute one or more parts of the aforementioned method. The processor-executable instructions can be configured to cause a processor to initiate executing one or more parts of the aforementioned method.

In another example, provided is a first apparatus. The first apparatus includes means for identifying one or more objects being used on one or more cloud computing platforms. In an example, the means for identifying the one or more objects further comprises: means for querying one or more respective cloud management platforms of the one or more cloud computing platforms for an identification of the one or more objects being used on the respective one or more cloud computing platforms, means for retrieving the identification of the one or more objects being used from a database storing a record of user activities, or a practicable combination thereof. The first apparatus includes means for receiving data describing the one or more objects. In an example, the means for receiving the data further comprises: means for querying the one or more cloud computing platforms for the data; means for querying a database for the data (where the database is independent of the one or more cloud computing platforms); means for storing the data in the database; or a practicable combination thereof. In an example, the data describing the one or more objects includes: user-defined data, historical data, real-time data, one or more configuration details of a server, one or more configuration parameters for a workload, one or more configuration details of a virtual network, one or more configuration details of a virtual machine, one or more configuration details of an operating system, one or more configuration details of software, one or more configuration details of hardware, one or more configuration details of a cluster, one or more configuration details of a network, one or more details of a remote script, one or more details of a pod of containers, one or more details of a load balancer, or a practicable combination thereof. The first apparatus includes means for receiving one or more rules restricting the use of the one or more objects. In an example, the means for receiving the one or more rules further comprises: means for receiving a user-defined rule; means for receiving one or more descriptions of what one or more specific objects in the one or more objects should include, should not include, or a practicable combination thereof; means for receiving a rule checking for a permitted geographic location of a given workload, a prohibited geographic location of a given workload, or a practicable combination thereof; means for receiving a rule checking for one or more known vulnerabilities; means for receiving a rule checking for a cost to implement one or more specific objects in the one or more objects; means for receiving a rule checking for a percentage of a license which has been used, a percentage of a license which has been not been used, or a practicable combination thereof; means for receiving a rule checking for a newer version of cloud management software; means for receiving a rule checking if a usage quota has been exceeded, the usage quota has not been exceeded, or a practicable combination thereof; means for receiving a rule checking for missing tags, present tags, or a practicable combination thereof; means for receiving a rule checking for compliance with one or more compliance parameters for a server; means for receiving a rule checking for compliance with one or more compliance parameters for a workload; or a practicable combination thereof. The first apparatus includes means for searching for one or more violations of the one or more rules by comparing the received data to the rules and means for executing, in response to identifying one or more violations, a response to the one or more violations. In an example, the response comprises one or more of: a user-defined response; storing the data describing the one or more objects; changing one or more configurations of one or more computing resources; sending one or more text messages, e-mails, or a practicable combination thereof to a user; applying a patch; determining that a patch is not to be applied; moving a workload from the one or more cloud computing platforms to a different cloud computing platform; powering down of a virtual machine; powering up of a virtual machine; stopping execution of an action; or a practicable combination thereof.

The second apparatus includes a processor and a memory coupled to the processor. The memory is configured to cause the processor to initiate creating specific logic circuits within the processor. The specific logic circuits are configured to cause the processor to initiate identifying, with a computing device, one or more objects being used on one or more cloud computing platforms. In an example, the identifying the one or more objects further comprises: querying one or more respective cloud management platforms of the one or more cloud computing platforms for an identification of the one or more objects being used on the respective one or more cloud computing platforms; retrieving the identification of the one or more objects being used from a database storing a record of user activities; or a practicable combination thereof. The specific logic circuits are configured to cause the processor to initiate receiving data describing the one or more objects. In an example, the receiving the data further comprises: querying the one or more cloud computing platforms for the data; querying a database for the data (where the database is independent of the one or more cloud computing platforms); storing the data in the database; or a practicable combination thereof. In an example, the data describing the one or more objects includes: user-defined data, historical data, real-time data, one or more configuration details of a server, one or more configuration parameters for a workload, one or more configuration details of a virtual network, one or more configuration details of a virtual machine, one or more configuration details of an operating system, one or more configuration details of software, one or more configuration details of hardware, one or more configuration details of a cluster, one or more configuration details of a network, one or more details of a remote script, one or more details of a pod of containers, one or more details of a load balancer, or a practicable combination thereof. The specific logic circuits are configured to cause the processor to initiate receiving one or more rules restricting the use of the one or more objects. In an example, the receiving of one or more rules further comprises: receiving a user-defined rule; receiving one or more descriptions of what one or more specific objects in the one or more objects should include, should not include, or a practicable combination thereof; receiving a rule checking for a permitted geographic location of a given workload, a prohibited geographic location of a given workload, or a practicable combination thereof; receiving a rule checking for one or more known vulnerabilities; receiving a rule checking for a cost to implement one or more specific objects in the one or more objects; receiving a rule checking for a percentage of a license which has been used, a percentage of a license which has been not been used, or a practicable combination thereof; receiving a rule checking for a newer version of cloud management software; receiving a rule checking if a usage quota has been exceeded, the usage quota has not been exceeded, or a practicable combination thereof; receiving a rule checking for missing tags, present tags, or a practicable combination thereof; receiving a rule checking for compliance with one or more compliance parameters for a server; receiving a rule checking for compliance with one or more compliance parameters for a workload; or a practicable combination thereof. The specific logic circuits are configured to cause the processor to initiate searching for one or more violations of the one or more rules by comparing the received data to the rules. The specific logic circuits are configured to cause the processor to initiate executing, in response to identifying one or more violations, a response to the one or more violations. In an example, the response comprises one or more of: a user-defined response; storing the data describing the one or more objects; changing one or more configurations of one or more computing resources; sending one or more text messages, e-mails, or a practicable combination thereof to a user; applying a patch; determining that a patch is not to be applied; moving a workload from the one or more cloud computing platforms to a different cloud computing platform; powering down of a virtual machine; powering up of a virtual machine; stopping execution of an action; or a practicable combination thereof.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings are presented to describe examples of the present teachings, and are not limiting.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The provided example methods and apparatuses relate to enforcing compliance with one or more administrative requirements relating to using computing resources.

To reduce overuse and abuse of virtual and remote computing resources by organizations' users, the organizations may attempt to manage their users by imposing administrative requirements. Administrative requirements can include, for example, policies, rules, regulations, the like, or a combination thereof. As examples, the administrative requirements can include corporate-mandated and legally-mandated administrative requirements. The administrative requirements can include restrictions on expenditures, restrictions on using certain hardware, restrictions on using certain software, the like, or a combination thereof. The administrative requirements can also include requirements to use certain hardware, requirements to use certain software, the like, or a combination thereof.

The administrative requirements can affect the users' use of computing resources such as computer hardware, computer software, the like, or a combination thereof. The computing resources can be provided by one or more cloud-computing platform. The computing resources can be located at multiple, disparate cloud computing systems. Further detail about computing resources and cloud computing, as they relate to enforcing compliance with one or more administrative requirements, are provided herein.

Examples disclosed hereby advantageously address long-felt industry needs, as well as other previously unidentified needs, and mitigate shortcomings of the conventional methods and the conventional apparatus. Disclosed examples beneficially improve functioning of a computer (e.g., a platform management device) and improve an existing technological process (e.g., managing use of one or more cloud computing platforms). Examples provided can beneficially reduce excess expenses to the organization. Examples provided can beneficially reduce, and in some cases eliminate, underuse, overuse, and abuse of virtual and remote computing resources. Among other advantages, provided examples disclosed hereby advantageously save time, reduce energy use, and save resources. Provided examples can also advantageously be used for compliance checking and auditing of computing resources to determine and enforce compliance with administrative requirements.

At least some of the provided examples also advantageously maintain a separate record of configuration parameters for specific servers and specific objects, which advantageously enables scanning an aggregate record, rather than requiring a user to query each individual object or server to obtain the required information. This advantageously increases search speed during enforcement actions, standardizes records of objects in a record which is separate from what may or may not be available from a specific device or a specific cloud management tool, and makes it easier to remediate violations of the administrative requirements. Thus, the provided examples simplify maintaining compliance with the administrative requirements across different workloads, across disparate computing resources, and across disparate cloud computing platforms. The provided example methods and apparatuses also represent improvements in, for example, the technical fields of computer management, computer resource management, and cloud computing.

Examples are disclosed in this application's text and drawings. Alternate examples can be devised without departing from the scope of the disclosure. Additionally, conventional elements of the current teachings may not be described in detail, or may be omitted, to avoid obscuring aspects of the current teachings.

The following list of abbreviations, acronyms, and terms is provided to assist in comprehending the current disclosure, and are not provided as limitations.

API—application programming interface
CMDB—configuration management database
CPU—central processing unit
GUI—graphical user interface
IaaS—infrastructure as a service
IT—information technology
PaaS—platform as a service
SaaS—software as a service Cloud computing is a model for enabling one or more cloud users (a "user") to access a shared pool of computing resources. The computing resources can include computer hardware, computer software, the like, or a combination thereof. The computing resources can include one or more processors, one or more servers (physical, virtual, or both), one or more storage devices (for example, memory, disk storage, the like, and combinations thereof), one or more network devices, one or more networks (for example, a virtual network, including interne protocol addresses), one or more firewalls, one or more load balancers, one or more virtual machines, one or more operating systems, one or more software applications, one or more programming languages, one or more computer-based services, one or more pods of containers, one or more web servers, the like, or a combination thereof. The computing resources can be offered with a service model which best suits a user's constraints (for example, skill level, needs, ability to pay, etc.). Cloud computing often has five characteristics: on-demand self-service by one or more users, broad network access, pooled computing resources, rapid elasticity, and measured service.

Users may not own the hardware constituting a cloud or the software run on the cloud's hardware. Instead, a user can lease, from a cloud provider, at least some portion of the hardware, at least some portion of the software, or both.

Cloud computing advantageously provides an economy of scale unattainable with user-owned and maintained resources. A user need not purchase a complete set of hardware and software necessary to complete a particular task or provide a particular service. Instead, the user only pays for the user's use (that is, a utility computing basis) or the user pays a flat rate on a time-basis (for example, the user purchases use of an e-mail application for $12.00 per month). This can be analogized to the user renting the computing resources the user needs, for the duration the user needs the computing resources. Further, the cloud provider can spread demand from multiple users across one or more machines, which improves machine utilization in an economically efficient manner. Improved machine utilization reduces a number of idle machines, which saves power and avoids overuse of a single machine. Thus, computing resources are efficiently shared among many users, which results in the economy of scale, cost savings for users, profits for cloud providers, and power savings.

Cloud computing is also dynamically scalable (though not in an unlimited manner) to meet a user's timely needs (for example, pay-as-you-grow (or shrink)). A workload can be run on multiple machines (for example, physical, virtual, or both) to meet service demand. A workload can be a combination of one or more processing loads, one or more storage loads, the like, or a combination thereof. The user can thus save money which would otherwise be allocated to purchase a multitude of computing resources needed to ensure the user can meet the user's peak needs.

Cloud computing also advantageously enables the user to focus on the user's core tasks, and unburdens the user from having to purchase, configure, secure, and maintain computing resources. The user is further unburdened by not having to learn new computing skills needed to configure and maintain underlying computing resources. Many of the cloud's processes are transparent to the user. Software running on the cloud may appear, to a user, on the user's computer as if the software was installed and running locally on the user's computer. Cloud computing can present the user with a simple environment.

A cloud can be configured based on the following service models: infrastructure as a service (IaaS), platform as a service (PaaS), software as a service (SaaS), or a combination thereof. Each of these are described in turn. Note that other service models are possible; the discussion below is not meant to be limiting.

When offering IaaS, a cloud provider offers access to at least a portion of user-configurable individual components in a shared pool of computing resources. The computing resources can include one or more processors, one or more servers (physical, virtual, or both), one or more storage devices (for example, memory, disk storage, the like, and combinations thereof), one or more network devices, one or more networks (for example, including internet protocol addresses), one or more firewalls, one or more load balancers, the like, or a combination thereof.

A user of IaaS can optionally install one or more operating systems, applications, or both, of the user's choice on the user-configurable individual components. The user may be required to maintain the installed software. The user may also be required to configure each user-configurable individual component.

In IaaS, the components can be offered for use for a user-determined duration. The components can be offered on a fractional (that is, shared) access basis or an exclusive access basis. In an example, the user can be billed for specific component use or the user can be billed at a flat rate based on the components used. IaaS offers a highly technical user a high level of implementation flexibility and a high level of configuration options.

When offering PaaS, the cloud provider offers a preconfigured arrangement of components and software, where the components and software are in a shared pool of computing resources. The computing resources can include one or more processors, one or more servers (physical, virtual, or both), one or more storage devices (for example, memory, disk storage, the like, and combinations thereof), one or more network devices, one or more networks (for example, including internet protocol addresses), one or more firewalls, one or more load balancers, the like, or a combination thereof. The preconfigured software can include one or more operating systems, one or more databases, one or more programming environments, one or more runtime environments, one or more web servers, the like, or a combination thereof.

In PaaS, the components and software can be offered for use for a user-determined duration. The components and software can be offered on a fractional (that is, shared) access basis or an exclusive access basis. In an example, the user can be billed for specific component and software use or the user can be billed at a flat rate based on the components used. PaaS advantageously offers a user, who has a specific need, a quick solution to the user's needs. However, PaaS does not require the user to purchase and manually configure the underlying resources. For example, a software developer can use a PaaS-based programming environment to develop a new program, without the software developer having to purchase a development server, an operating system for the development server, and programming language software. An environment can include a group of jointly acting computing resources.

When offering SaaS, the cloud provider offers pre-installed and cloud provider-maintained application software. The user does not maintain the underlying hardware, network, database, operating system, or application. In examples, the user can access the application software from many different locations, such as via the Internet.

In an example, the user can be billed for specific software use or the user can be billed at a flat rate based on the software used. SaaS advantageously offers a user, who has a specific software need, with a quick solution to the user's needs. However, SaaS does not require the user to purchase and manually configure the underlying resources or the software. For example, a businessperson can use a SaaS web-based email program, without the businessperson having to purchase, configure, and maintain a server, an operating system for the server, and email software.

Cloud computing has several different deployment models. For example, a private cloud deployment model can be provided for exclusive use by users in an organization. As a further, example, a community cloud deployment model can be provided for use by an exclusive community of users having a common need. Moreover, a public cloud deployment model can be provided for use by anyone. Further, any of these three deployment models can be combined and implemented with technology enabling portable data, one or more portable applications, or both.

Cloud computing requires hardware, such as one or more processors, one or more servers (physical, virtual, or both), one or more storage devices (for example, memory, disk storage, the like, and combinations thereof), one or more network devices, one or more networks, the like, or a combination thereof. Configuration of the hardware can be very flexible. A first hardware component in a first cloud can be configured to be coupled to a second hardware component located in the first cloud or located in a second cloud. The first hardware component in the first cloud can be configured to be coupled to a third hardware component located remotely from the first cloud.

Figure 1:
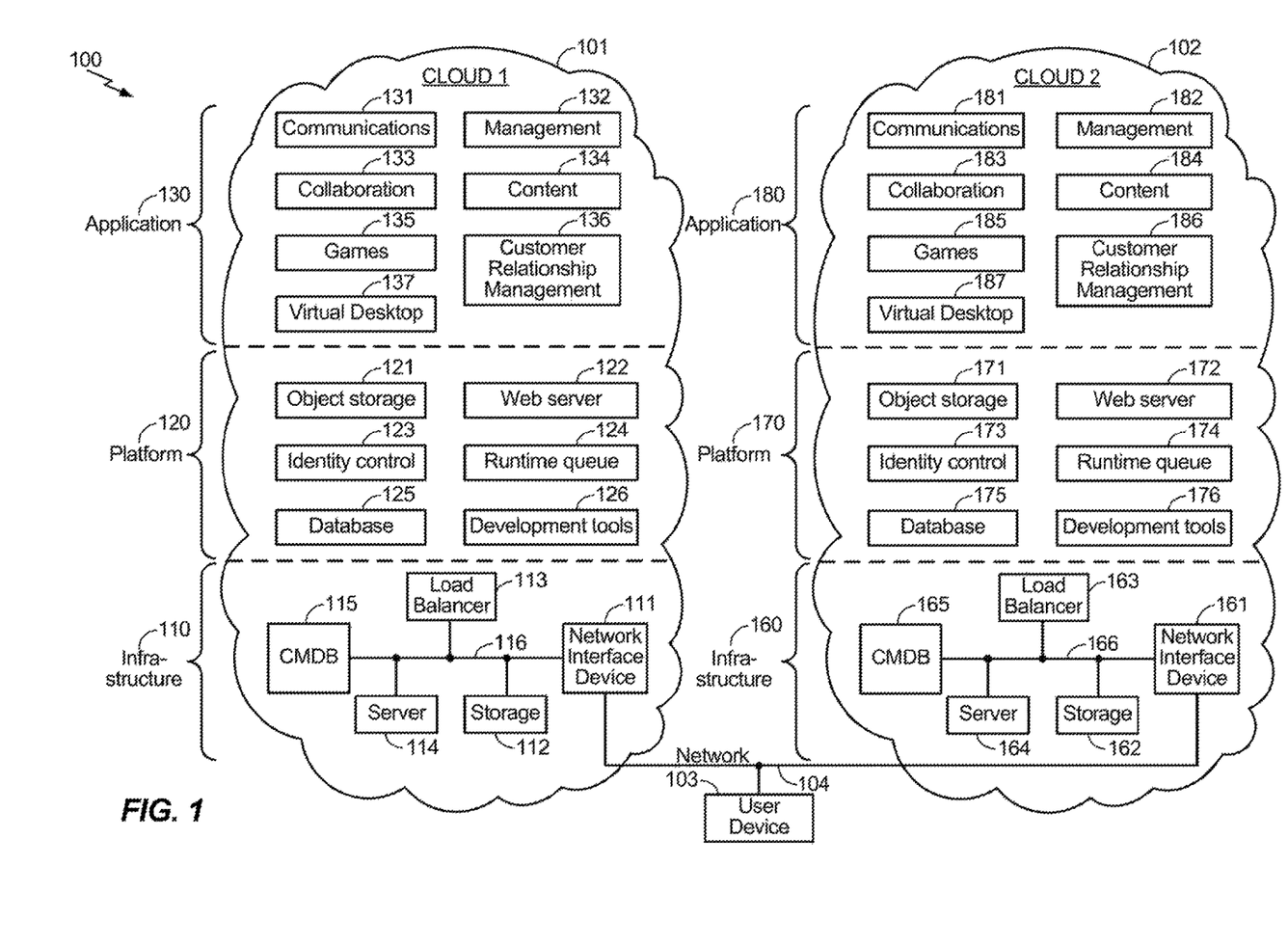
FIG. 1 depicts an example cloud computing arrangement.

FIG. 1 depicts an example cloud computing arrangement 100 including a first cloud 101 and a second cloud 102. For example, a first cloud provider can offer the first cloud 101, while a second cloud provider offers the second cloud 102.

A user device 103 is coupled to the first cloud 101 and the second cloud 102 via one or more networks 104. The user device 103 can be a computer (for example, a desktop computer, a laptop computer, a tablet computer, the like, or a combination thereof), a mobile phone, the like, or a combination thereof. The one or more networks 104 can be a private network, a local network, a wide-area network, the Internet, any suitable communication network, the like, or a combination thereof. The one or more networks 104 can be implemented on any suitable platform including a wired network, a wireless network, an optical network, the like, or a combination thereof.

The first cloud 101 can be divided into infrastructure 110, platform 120, and one or more applications 130. The infrastructure 110 includes tangible electronic hardware. The infrastructure 110 can include one or more network interface devices 111. The one or more network interface devices 111 can be coupled to the one or more networks 104. The infrastructure 110 can include one or more storage devices 112. The one or more storage devices 112 can include one or more disk storage devices, a quantity of memory (such as random-access memory (RAM), read-only memory (ROM), flash RAM, the like, or a combination thereof), one or more solid state drives (SSD), the like, or a combination thereof. The infrastructure 110 can include one or more load balancers 113, one or more servers 114, one or more Configuration Management Databases (CMDB) 115, the like, or a combination thereof. The CMDB 115 can control and manage distributed virtual computing in the first cloud 101. The CMDB 115 stores data describing policies to be enforced across constituent data centers in the first cloud 101. The CMDB 115 can also store configuration information for instantiating workloads using one or more specific environments which are configured to use the first cloud's 101 constituent computing components (for example, computing components in the infrastructure 110). Constituent components of the infrastructure 110 can be coupled to each other via a first cloud network 116.

The platform 120 and the applications 130 include software which is configured to implement, at least in part, at least a portion of the hardware in the infrastructure 110. In an example, at least one of the platform 120 or the applications 130 can be a set of computer instructions stored on a non-transitory computer-readable storage medium which, upon execution, configure one or more processors (for example, in the server 114) to create specific logic circuits (for example, one or more tangible electronic circuits configured to perform a logical operation), thus at least temporarily converting the one or more processors into a special-purpose processor.

The platform 120 can optionally include object storage 121, one or more web servers 122, identity control 123, one or more runtime queues 124, one or more databases 125, one or more development tools 126, the like, or a combination thereof.

The applications 130 can optionally include software configured to enable communications 131, management 132, collaboration 133, content 134, one or more games 135, customer relationship management 136, one or more virtual desktops 137, the like, or a combination thereof.

The second cloud 102 can be divided into infrastructure 160, platform 170, and one or more applications 180. The infrastructure 160 includes tangible electronic hardware. The infrastructure 160 can include one or more network interface devices 161. The one or more network interface devices 161 can be coupled to the one or more networks 104. The infrastructure 160 can include one or more storage devices 162. The one or more storage devices 162 can include one or more disk storage devices, a quantity of memory (such as RAM, ROM, flash RAM, the like, or a combination thereof), one or more SSD, the like, or a combination thereof. The infrastructure 160 can include one or more load balancers 163, one or more servers 164, one or more CMDB 165, the like, or a combination thereof. The CMDB 165 can control and manage distributed virtual computing in the second cloud 102. The CMDB 165 stores data describing policies to be enforced across constituent data centers in the second cloud 102. The CMDB 165 can also store configuration information for instantiating workloads using one or more specific environments which are configured to use the second cloud's 102 constituent computing components (for example, computing components in the infrastructure 160). Constituent components of the infrastructure 160 can be coupled to each other via a first cloud network 166.

The platform 170 and the applications 180 include software which is configured to implement, at least in part, at least a portion of the hardware in the infrastructure 160. In an example, at least one of the platform 170 or the applications 180 can be a set of computer instructions stored on a non-transitory computer-readable storage medium which, upon execution, configure one or more processors (for example, in the server 164) to create specific logic circuits (for example, one or more tangible electronic circuits configured to perform a logical operation), thus at least temporarily converting the one or more processors into a special-purpose processor.

The platform 170 can optionally include object storage 171, one or more web servers 172, identity control 173, one or more runtime queues 174, one or more databases 175, one or more development tools 176, the like, or a combination thereof.

The applications 180 can optionally include software configured to enable communications 181, management 182, collaboration 183, content 184, one or more games 185, customer relationship management 186, one or more virtual desktops 187, the like, or a combination thereof.

In an example, a user can implement computing resources in a cloud (for example, the first cloud 101, the second cloud 102) by creating and instantiating one or more workloads (for example, one or more virtual machines including an operating system and user-required specific software configured to run on a specific type of server). Cloud-enabled virtualization enables the user to interact with an abstraction which takes the place of a physical system. The user can access, configure, and manage the computing resources via a cloud's respective portal, an application programming interface (API), the like, or a combination thereof.

Different cloud providers offer different clouds. For example, a first cloud provider can offer the first cloud 101, while a second cloud provider offers the second cloud 102. This is beneficial, as the cost for a single cloud provider to provide all conceivable computing resources is prohibitive. This also provides cloud users with more options than can be provided by a single cloud provider. Accordingly, to meet a certain need, a user may want to implement a collection of computing resources which includes computing resources in disparate clouds. For example, the user may need to implement a collection of computing resources including a first computing resource which is available in the first cloud 101 and not available in the second cloud 102. The user's collection of computing resources may also include a second computing resource which is available in the second cloud 102 and not available in the first cloud 101. The first and second computing resources likely will have different, and possibly incompatible, respective APIs. The provided apparatus and methods enable the user to manage implementing different computing resources which are different parts of different clouds.

Figure 2:
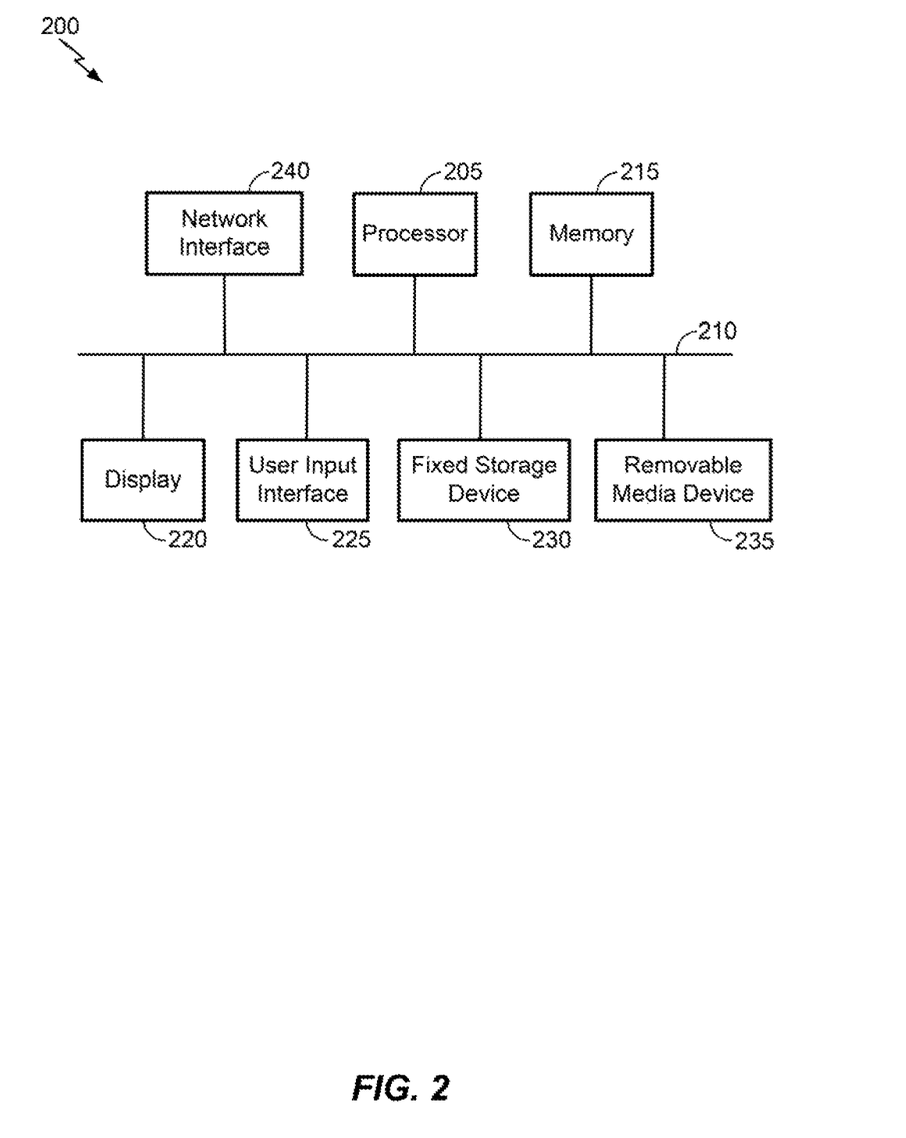
FIG. 2 depicts an example computing device suitable for implementing examples of the presently disclosed subject matter.

FIG. 2 illustrates an example computing device 200 suitable for implementing examples of the presently disclosed subject matter. In an example, the computing device 200 can be the user device 103. At least a portion of the methods, sequences, algorithms, steps, or blocks described in connection with the examples disclosed hereby can be embodied directly in hardware, in software executed by a processor (for example, a processor described hereby), or in a combination of the two. In an example, a processor includes multiple discrete hardware components. A software module can reside in a storage medium (for example, a memory device), such as a RAM, a flash memory, a ROM, an erasable programmable read-only memory (EPROM), an electrically erasable programmable read-only memory (EEPROM), a register, a hard disk, a removable disk, a compact disc read-only memory (CD-ROM), a storage medium, the like, or a combination thereof. An example storage medium (for example, a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (for example, an application specific integrated circuit (ASIC)), by program instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a method, a sequence, an algorithm, a step, or a block described hereby. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (that is, a non-transient) machine-readable media specifically excludes a transitory propagating signal. Additionally, a sequence of actions described hereby can be entirely within any form of non-transitory computer-readable storage medium having stored thereby a corresponding set of computer instructions which, upon execution, configure the processor to create specific logic circuits (for example, one or more tangible electronic circuits configured to perform a logical operation) in the processor. Configuring the processor to create specific logic circuits in the processor can at least temporarily transform the processor into a specific-purpose processor. Thus, examples may be in a number of different forms, all of which have been contemplated to be within the scope of the disclosure.

In an example, when a general-purpose computer (for example, a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method, a sequence, an algorithm, a step, or a block described in connection with an example disclosed hereby. Special programming can constitute any software which can cause a computer (for example, a general-purpose computer, a special-purpose computer, etc.) to be configured to perform one or more functions, features, steps algorithms, blocks, or a combination thereof, as disclosed hereby. A sufficient algorithm can constitute special programming. In an example, a combination of two or more related method steps disclosed hereby can form a sufficient algorithm.

The computing device 200 can be, for example, a desktop computer, a laptop computer, a mobile device, the like, or a combination thereof. The computing device 200 can include a processor 205, a bus 210, a memory 215 (such as RAM, ROM, flash RAM, the like, or a combination thereof), a video display 220 (such as a display screen), a user input interface 225 (which can include one or more controllers and associated user input devices such as a keyboard, mouse, touch screen, the like, or a combination thereof), a fixed storage device 230 (such as a hard drive, flash storage, the like, or a combination thereof), a removable media device 235 (operative to control and receive an optical disk, flash drive, the like, or a combination thereof), a network interface 240 operable to communicate with one or more remote devices via a suitable network connection, or a combination thereof. Examples of the disclosed subject matter can be implemented in, and used with, different component and network architectures.

The processor 205 is configured to control operation of the user device 200, including performing at least a part of a method described hereby. The processor 205 can perform logical and arithmetic operations based on processor-executable instructions stored within the memory 215. The processor 205 can execute instructions stored in the memory 215 to implement at least a part of a method described herein (for example, the processing illustrated in FIG. 3). The instructions, when executed by the processor 205, can transform the processor 205 into a special-purpose processor which causes the processor to perform at least a part of a function described hereby.

The processor 205 can comprise or be a component of a processing system implemented with one or more processors. The one or more processors can be implemented with a microprocessor, a microcontroller, a digital signal processor, a field programmable gate array (FPGA), a programmable logic device (PLD), an ASIC, a controller, a state machine, gated logic, a discrete hardware component, a dedicated hardware finite state machine, any other suitable entity which can at least one of manipulate information (for example, calculating, logical operations, and the like), control another device, the like, or a combination thereof. The processor 205 may also be referred to as a CPU, a special-purpose processor, or both.

The bus 210 interconnects components of the computing device 200. The bus 210 can enable information communication between the processor 205 and one or more components coupled to the processor 205. The bus system 210 can include a data bus, a power bus, a control signal bus, a status signal bus, the like, or a combination thereof. The components of the computing device 200 can be coupled together to communicate with each other using a different suitable mechanism.

The memory 215, can include at least one of ROM, RAM, a flash memory, an EPROM, an EEPROM, a register, other memory, the like, or a combination thereof stores information (for example, data, instructions, software, the like, or a combination thereof) and is configured to provide the information to the processor 205. The RAM can be a main memory configured to store an operating system, an application program, the like, or a combination thereof. The ROM (for example, a flash memory) can be configured to store a basic input-output system (BIOS) which can control basic hardware operation such as the processor's 205 interaction with peripheral components. The memory 215 can also include a non-transitory machine-readable media configured to store software. Software can mean any type of instructions, whether referred to as at least one of software, firmware, middleware, microcode, hardware description language, the like, or a combination thereof. Instructions can include code (for example, in source code format, in binary code format, executable code format, or in any other suitable code format). The memory 215 is an example of an electronic memory device.

The video display 220 can include a component configured to visually convey information to a user of the computing device 200.

The user input interface 225 can include a keypad, a microphone, a speaker, a display, the like, or a combination thereof. The user input interface 225 can include a component configured to convey information to a user of the computing device 200, receive information from the user of the computing device 200, or both.

The fixed storage device 230 can be integral with the computing device 200 or can be separate and accessed through other interfaces. The fixed storage device 230 can be an information storage device which is not configured to be removed during use, such as a hard disk drive.

The removable media device 235 can be integral with the computing device 200 or can be separate and accessed through other interfaces. The removable media device 235 can be an information storage device which is configured to be removed during use, such as a memory card, a jump drive, flash memory, the like, or a combination thereof. Code to implement the present disclosure can be stored in computer-readable storage media such as one or more of the memory 215, the fixed storage device 230, the removable media device 235, a remote storage location, the like, or a combination thereof.

The network interface 240 can electrically couple the computing device 200 to a network and enable exchange of information between the computing device 200 and the network. The network, in turn, can couple the computing device 200 to another electronic device, such as a remote server, a remote storage medium, the like, or a combination thereof. The network can enable exchange of information between the computing device 200 and the electronic device.

The network interface 240 can provide coupling (for example, to the network 104) via a wired connection, a wireless connection, or a combination thereof. The network interface 240 can provide such connection using any suitable technique and protocol as is readily understood by one of skill in the art. Example techniques and protocols include digital cellular telephone, WiFi™, Bluetooth®, near-field communications (NFC), the like, and combinations thereof. For example, the network interface 240 can enable the computing device 200 to communicate with other computers (for example, the first cloud 101 and the second cloud 102) via one or more local, wide-area, or other communication networks. Other devices or components (not shown in FIG. 2) can be coupled via the network interface 240.

All of the components illustrated in FIG. 2 need not be present to practice the present disclosure. Further, the components can be interconnected in different ways from that illustrated.

Figure 3:
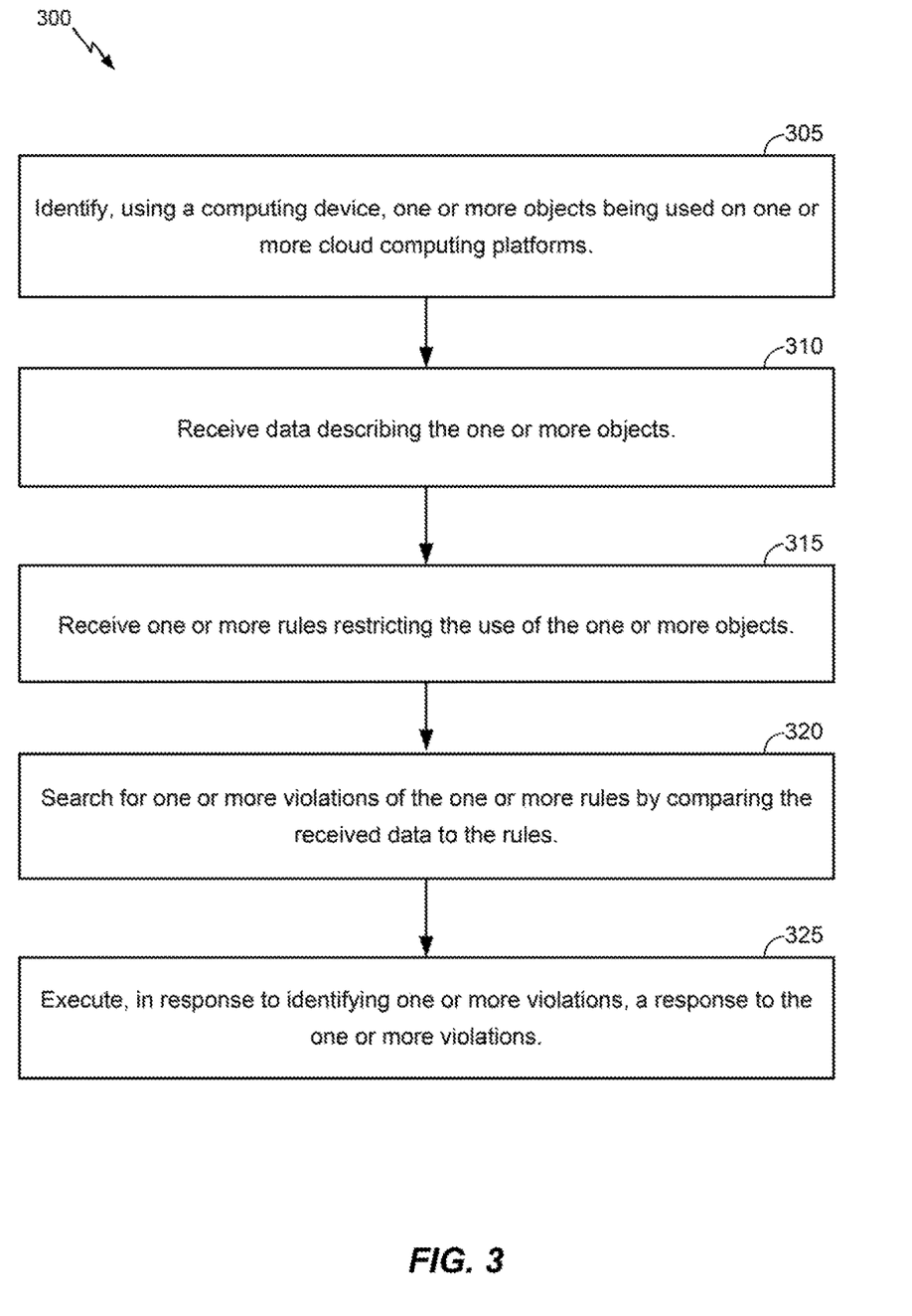
FIG. 3 depicts an example method for enforcing compliance with one or more administrative requirements relating to using computing resources.

FIG. 3 depicts an example method 300, which can be used to enforce compliance with one or more administrative requirements relating to using computing resources. The method 300 can be performed at least in part by at least a portion of the apparatus described hereby, such as the user device 103, the computing device 200, the like, or a combination thereof. The method 300 can beneficially reduce excess expenses to an organization. The method 300 can beneficially reduce, and in some cases eliminate, underuse, overuse, and abuse of virtual and remote computing resources. Among other advantages, the method 300 can beneficially save time, reduce energy use, and save resources. The method 300 can also advantageously be used for compliance checking and auditing of computing resources to determine and enforce compliance with administrative requirements. A platform management device which is configured to perform at least a portion of the method 300 has improved functions, relative to conventional techniques and devices.

The method 300 can be performed on a substantially periodic basis (for example, hourly, daily, at a specific time each day, etc.). The method 300 can be performed substantially continuously over a period of time. In an example, initiating the method 300 can be triggered automatically. In an example, the initiating the method 300 is not performed automatically, but instead can be performed in response to receiving an instruction to initiate the method 300. The instruction can be received via a GUI. The GUI can be accessible via the Internet, which enables conveniently both initiating and performing the method 300 remotely via the Internet.

In block 305, one or more objects being used on one or more cloud computing platforms are identified, for example, using a computing device. In an example, at least a portion of the one or more objects being used are available from a first platform, a second platform, or a combination thereof. In an example, a first portion of the one or more objects being used are available from the first platform, but are not available from the second platform. In a further example, the one or more objects being used are available from the second platform, but are not available from the first platform. In an example, a platform is a cloud computing system.

Optionally, the identifying the one or more objects includes: querying one or more respective cloud management platforms of the one or more cloud computing platforms for an identification of the one or more objects being used on the respective one or more cloud computing platforms, retrieving the identification of the one or more objects being used from a database storing a record of user activities (for example, data describing the identification), or a practicable combination thereof. In an example, the querying is not performed automatically, but instead can be performed in response to receiving an instruction (for example, via the GUI) to initiate the querying. The identification can be received via the GUI, the user input interface 225, the network interface 240, the like, or a combination thereof.

Information describing the one or more objects can be displayed (for example, with the GUI, with the video display, such as a video display of the computing device).

At least a portion of the identification of the one or more objects being used can be saved to an electronic memory device, at least a portion of the identification of the one or more objects being used can be retrieved from the electronic memory device, or both. At least a portion of the identification of the one or more objects being used can be saved to an external system of record, at least a portion of the identification of the one or more objects being used can be retrieved from the external system of record, or both. In an example, using the external system of record as an aggregate record of information enables a user to scan the aggregate record, rather than requiring the user to query each individual computing resource, object, server, the like, or combination thereof to obtain the required information. Using the external system of record can be performed, for example, when an IT infrastructure has a plurality of disparate systems of records and a plurality of disparate management and monitoring platforms. The external system of record can be independent of any of the clouds providing computing resources.

One or more cloud deployments can be retrieved and the results stored in the external system of record. In addition, as users configure and deploy computing resources, records of the user's activities are written to the external system of record to maintain a record of the activities. The stored information can be historical data, real time data, configuration data, compliance data, or a combination thereof which is enables enforcing one or more rules.

In block 310, data describing the one or more objects is received. Optionally, the receiving the data further comprises: querying the one or more cloud computing platforms for the data, querying a database for the data (where the database is independent of the one or more cloud computing platforms), storing the data in the database, or a practicable combination thereof. Each cloud can be different with respect to what data is available and what format the data is presented in, thus, the received data can be analyzed and reformatted to a standard format.

The data describing the one or more objects can be received via the GUI, the user input interface 225, the network interface 240, the like, or a combination thereof.

Optionally, the data describing the one or more objects includes: user-defined data, historical data, real-time data, one or more configuration details of a server, one or more configuration parameters for a workload, one or more configuration details of a virtual network, one or more configuration details of a virtual machine, one or more configuration details of an operating system, one or more configuration details of software, one or more configuration details of hardware, one or more configuration details of a cluster, one or more configuration details of a network, one or more details of a remote script, one or more details of a pod of containers, one or more details of a load balancer, or a practicable combination thereof.

At least a portion of the data describing the one or more objects can be saved to an electronic memory device, at least a portion of the data describing the one or more objects can be retrieved from the electronic memory device, or both. At least a portion of the data describing the one or more objects can be saved to an external system of record, at least a portion of the data describing the one or more objects can be retrieved from the external system of record, or both.

Information describing at least a portion of the data can be displayed (for example, with the GUI, with the video display, such as a video display of the computing device).

In block 315, one or more rules restricting the use of the one or more objects are received. The rules can be user-provided. The rules can be in the form of machine-readable code. As used herein, the term "rules" is interchangeable with the terms "administrative requirements," "policies," and "regulations." The rules can be in a form of computer code, computer instructions, software, data, the like, or a combination thereof. The rules can be configured to reduce mistakes and reduce instances of building IT infrastructure which does not comply with the organization's administrative requirements (for example, relating to availability, performance, cost, the like, etc.). For example, if a company requires that database deployments always include two central processing units (CPUs), then the rules require a user not deploy a database deployment having only one CPU. The rules can include requirements based on user type (administrative, regular user, super user, etc.), user location, a user's group, a user's privilege level, a role of a server to be deployed, a workload which is to be deployed, the like, or a combination thereof.

In an example, the receiving the rules is not performed automatically, but instead can be performed in response to receiving an instruction (for example, via the GUI) to initiate the receiving the rules.

The one or more rules can be received via the GUI, the user input interface 225, the network interface 240, the like, or a combination thereof.

A rule can be a logical statement comprised of a condition action ("if") and one or more responses (i.e., actions) which are triggered ("then") as a result. The rules can be stored in a template, a blueprint, the like, or a combination thereof. The rules can include requirements relating to parameters for a specific server's function. The rules can include requirements relating to parameters for a specific object's function. The rules can regulate configuration parameters based on geographic location of a given workload, known vulnerabilities, or costs. The rules, when implemented as described hereby, can thwart a user's efforts to perform an end-run around administrative requirements.

When the rules are user-provided, the rules enable the user to define conditional logic which can be periodically executed and which can trigger customized responses based on the results of the execution. The rules can be used, for example, to automate policy enforcement through one or more corrective actions, proactively adapt configurations of one or more computing resources based on a state of one or more computing environments, perform one or more health checks, notify one or more stakeholders of one or more required actions, the like, or a combination thereof.

As an example, a rule can require that when 75% of a license is used, the response is to send a message to an administrator. The rule can trigger sending an e-mail alert to the administrator when the license is going to expire in less than a threshold number of days. In another example, a rule can trigger sending an e-mail alert to the administrator when more than a threshold percentage of a maximum number of servers are in use.

As an example, a rule can check for a version (i.e., a revision level) of running software, store the results of the check, and e-mail the administrator if there is a newer version.

In another example, a rule can send an e-mail alert to one or more administrators of a group when the group's quota reaches a defined threshold.

As an example, a rule can check one or more deployed servers for a set of required tags. The rule can send an e-mail to the server owner if any tags are missing.

Optionally, the receiving of one or more rules includes: receiving a user-defined rule; receiving one or more descriptions of what one or more specific objects in the one or more objects should include, should not include, or a practicable combination thereof; receiving a rule checking for a permitted geographic location of a given workload, a prohibited geographic location of a given workload, or a practicable combination thereof; receiving a rule checking for one or more known vulnerabilities; receiving a rule checking for a cost to implement one or more specific objects in the one or more objects; receiving a rule checking for a percentage of a license which has been used, a percentage of a license which has been not been used, or a practicable combination thereof; receiving a rule checking for a newer version of cloud management software; receiving a rule checking if a usage quota has been exceeded, the usage quota has not been exceeded, or a practicable combination thereof; receiving a rule checking for missing tags, present tags, or a practicable combination thereof; receiving a rule checking for compliance with one or more compliance parameters for a server; receiving a rule checking for compliance with one or more compliance parameters for a workload; or a practicable combination thereof.

The received one or more rules action can relate to (for example, regulate) provisioning one or more servers, provisioning one or more objects, provisioning a virtual network, configuring an operating system, configuring software, configuring a cluster, configuring a network, deploying a pod of containers, a networking change, deploying a virtual network, deploying a load balancer, emailing a user, coupling a virtual network to an external system, performing an automatable operation, scaling up a deployed computing resource, scaling down a deployed computing resource, provisioning one or more web servers, the like, or a practicable combination thereof.

The received one or more rules action can relate to (for example, regulate) one or more configuration details of a server, one or more compliance parameters for the server, one or more configuration details for a workload, one or more compliance parameters for the workload, one or more configuration details of a virtual network, one or more configuration details of an operating system, one or more configuration details of software, one or more configuration details of hardware, one or more configuration details of an object, one or more configuration details of a cluster, one or more configuration details of a network, one or more configuration details of a web server, a server deployment, a remote script configured to be run on a server, deploying a pod of containers, a networking change, deploying a virtual network, deploying a load balancer, an internet protocol address, the like, or a practicable combination thereof.

Both a condition of a rule and a response of a rule can be software plug-ins. Return signatures for a condition plug-in can return a tuple. The tuple can have one or more values indicating if the condition is satisfied, which forms a basis for determining is a response is performed (i.e., run).

At least a portion of the rules can be saved to an electronic memory device, at least a portion of the rules can be retrieved from the electronic memory device, or both. At least a portion of the rules can be saved to an external system of record, at least a portion of the rules can be retrieved from the external system of record, or both.

Information describing at least a portion of the rules can be displayed (for example, with the GUI, with the video display, such as a video display of the computing device).

In block 320, the received data is compared to the rules to search for one or more violations of the one or more rules. The search can be performed automatically, that is, without a user instructing that the search be performed. The search can be performed in accordance with a regular, defined schedule. In an example, the comparison is not performed automatically, but instead can be performed in response to receiving an instruction (for example, via the GUI) to initiate the comparison.

At least a portion of the results of the search for violations can be saved to an electronic memory device, at least a portion of the results of the search for violations can be retrieved from the electronic memory device, or both. At least a portion of the results of the search for violations can be saved to an external system of record, at least a portion of the results of the search for violations can be retrieved from the external system of record, or both.

Information describing at least a portion of the results of the search for violations can be displayed (for example, with the GUI on the video display, such as a video display of the computing device).

In block 325, in response to identifying one or more violations, a response to the one or more violations is executed. The response can be performed automatically, that is, without a user instructing the response be performed. The response can be user-provided and can be required in response to a violation of one or more rules.

In an example, the response is not performed automatically, but instead can be performed in response to receiving an instruction (for example, via the GUI) to initiate the response.

The response may include more than one action performed in response to the one or more violations. In an example, the response comprises one or more of: a user-defined response; storing the data describing the one or more objects; changing one or more configurations of one or more computing resources; sending one or more text messages, e-mails, or a practicable combination thereof to a user; applying a patch; determining that a patch is not to be applied; moving a workload from the one or more cloud computing platforms to a different cloud computing platform; powering down of a virtual machine; powering up of a virtual machine; stopping execution of an action; or a practicable combination thereof.

Information describing one or more specific responses to one or more specific violations can be saved to an electronic memory device, information describing one or more specific responses to one or more specific violations can be retrieved from the electronic memory device, or both. At least a portion of the information describing one or more specific responses to one or more specific violations can be saved to an external system of record, at least a portion of the information describing one or more specific responses to one or more specific violations can be retrieved from the external system of record, or both.

Information describing one or more specific responses to one or more specific violations can be displayed (for example, with the GUI on the video display, such as a video display of the computing device). The GUI can prompt the user to execute the response. A user instruction to execute the response can be received and thus trigger the response.

Optionally, the response to the one or more violations can include calling one or more APIs from one or more computing resources to perform at least a part of the response. In an example, the response includes sending a first call to a first respective API of a first computing resource in a first cloud and sending a second call to a second respective API of a second computing resource in a second cloud. The one or more APIs can be called by at least a portion of the apparatus described hereby, such as the user device 103, the computing device 200, the like, or a combination thereof.

The foregoing blocks are not limiting of the examples. The blocks can be combined and/or the order can be rearranged, as practicable.

As used hereby, the term "example" means "serving as an example, instance, or illustration." Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements." For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, modules, circuits, and steps described in the examples disclosed hereby can be implemented as electronic hardware, computer software, or combinations of both, as practicable. To clearly illustrate this interchangeability of hardware and software, example components, blocks, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, for each of the examples described hereby, a corresponding electrical circuit of any such examples may be described hereby as, for example, "logic configured to" perform a described action.

At least one example provided hereby can include a non-transitory (that is, a non-transient) machine-readable media and/or a non-transitory (that is, a non-transient) computer-readable media storing processor-executable instructions (for example, "code") configured to cause a processor (for example, a special-purpose processor) to transform the processor and any other cooperating devices into a machine (for example, a special-purpose processor) configured to perform at least a part of a function described hereby, at least a part of a method described hereby, the like, or a combination thereof. Performing the at least a part of a function described hereby can include initiating at least a part of the function described hereby. Performing the at least a part of a method described hereby can include initiating at least a part of the method described hereby. In an example, execution of the stored instructions can transform a processor and any other cooperating devices into at least a part of an apparatus described hereby. A non-transitory (that is, a non-transient) machine-readable media specifically excludes a transitory propagating signal. Further, one or more embodiments can include a computer-readable medium embodying at least a part of a function described hereby, at least a part of a method described hereby, the like, or a combination thereof.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. While this disclosure describes examples, changes and modifications can be made to the examples disclosed hereby without departing from the scope defined by the appended claims. The present disclosure is not intended to be limited to the specifically disclosed examples alone.

What is claimed is:

1. A method, comprising:
   determining, by a computing device, an instance of a workload to be run on one or more cloud computing platforms;
   identifying, by the computing device, one or more objects on the one or more cloud computing platforms to be used by the one or more cloud computing platforms to run the instance of the workload;
   receiving, by the computing device, data describing one or more actual configurations of the one or more objects;
   receiving, by the computing device, one or more rules restricting a use of the one or more objects to one or more required configurations;
   searching, by the computing device, for one or more violations of the one or more rules by comparing the one or more actual configurations to the one or more required configurations;
   executing, by the computing device and in response to one or more identifications of the one or more violations, a response to the one or more violations that changes the one or more actual configurations of the one or more objects on the one or more cloud computing platforms to the one or more required configurations; and
   causing, by the computing device, the one or more cloud computing platforms to run the instance of the workload with the one or more objects in the one or more required configurations.

2. The method of claim 1, wherein the identifying the one or more objects further comprises:
   querying one or more respective cloud management platforms of the one or more cloud computing platforms for an identification of the one or more objects being used on the respective one or more cloud computing platforms;
   retrieving the identification of the one or more objects being used from a database storing a record of user activities; or
   a practicable combination thereof.

3. The method of claim 1, wherein the receiving the data further comprises:
   querying the one or more cloud computing platforms for the data;
   querying a database for the data, wherein the database is independent of the one or more cloud computing platforms;
   storing the data in the database; or
   a practicable combination thereof.

4. The method of claim 1, wherein the data describing the one or more objects include:
   user-defined data,
   historical data,
   real-time data,
   one or more configuration details of a server,
   one or more configuration parameters for the workload,
   one or more configuration details of a virtual network,
   one or more configuration details of a virtual machine,
   one or more configuration details of an operating system,
   one or more configuration details of software,
   one or more configuration details of hardware,
   one or more configuration details of a cluster,
   one or more configuration details of a network,
   one or more details of a remote script,
   one or more details of a pod of containers,
   one or more details of a load balancer, or
   a practicable combination thereof.

5. The method of claim 1, wherein the receiving the one or more rules further comprises:
   receiving a user-defined rule;
   receiving one or more descriptions of what one or more specific objects in the one or more objects includes, excludes, or a practicable combination thereof;
   receiving a rule checking for a permitted geographic location of a given workload, a prohibited geographic location of a given workload, or a practicable combination thereof;
   receiving a rule checking for one or more known vulnerabilities;
   receiving a rule checking for a cost to implement one or more specific objects in the one or more objects;
   receiving a rule checking for a percentage of a license that has been used, a percentage of a license that has been not been used, or a practicable combination thereof;
   receiving a rule checking for a newer version of cloud management software;
   receiving a rule checking if a usage quota has been exceeded, the usage quota has not been exceeded, or a practicable combination thereof;
   receiving a rule checking for missing tags, present tags, or a practicable combination thereof;
   receiving a rule checking for compliance with one or more compliance parameters for a server;
   receiving a rule checking for compliance with one or more compliance parameters for the workload; or
   a practicable combination thereof.

6. The method of claim 1, wherein the response comprises one or more of:
   a user-defined response;
   storing the data describing the one or more objects;
   changing one or more configurations of one or more computing resources;
   sending one or more text messages, e-mails, or a practicable combination thereof to a user;
   applying a patch;
   determining that a patch is not to be applied;
   moving the workload from the one or more cloud computing platforms to a different cloud computing platform;

powering down of a virtual machine;
powering up of a virtual machine;
stopping execution of an action; or
a practicable combination thereof.

7. An apparatus, comprising:
means for determining an instance of a workload to be run on one or more cloud computing platforms;
means for identifying one or more objects on the one or more cloud computing platforms to be used by the one or more cloud computing platforms to run the instance of the workload;
means for receiving data describing one or more actual configurations of the one or more objects;
means for receiving one or more rules restricting a use of the one or more objects to one or more required configurations;
means for searching for one or more violations of the one or more rules by comparing the one or more actual configurations to the one or more required configurations;
means for executing, in response to one or more identifications of the one or more violations, a response to the one or more violations that changes the one or more actual configurations of the one or more objects on the one or more cloud computing platforms to the one or more required configurations; and
means for causing the one or more cloud computing platforms to run the instance of the workload with the one or more objects in the one or more required configurations.

8. The apparatus of claim 7, wherein the means for identifying the one or more objects further comprises:
means for querying one or more respective cloud management platforms of the one or more cloud computing platforms for an identification of the one or more objects being used on the respective one or more cloud computing platforms;
means for retrieving the identification of the one or more objects being used from a database storing a record of user activities; or
a practicable combination thereof.

9. The apparatus of claim 7, wherein the means for receiving the data further comprises:
means for querying the one or more cloud computing platforms for the data;
means for querying a database for the data, wherein the database is independent of the one or more cloud computing platforms;
means for storing the data in the database; or
a practicable combination thereof.

10. The apparatus of claim 7, wherein the data describing the one or more objects include:
user-defined data,
historical data,
real-time data,
one or more configuration details of a server,
one or more configuration parameters for the workload,
one or more configuration details of a virtual network,
one or more configuration details of a virtual machine,
one or more configuration details of an operating system,
one or more configuration details of software,
one or more configuration details of hardware,
one or more configuration details of a cluster,
one or more configuration details of a network,
one or more details of a remote script,
one or more details of a pod of containers,
one or more details of a load balancer, or
a practicable combination thereof.

11. The apparatus of claim 7, wherein the means for receiving the one or more rules further comprises:
means for receiving a user-defined rule;
means for receiving one or more descriptions of what one or more specific objects in the one or more objects includes, excludes, or a practicable combination thereof;
means for receiving a rule checking for a permitted geographic location of a given workload, a prohibited geographic location of a given workload, or a practicable combination thereof;
means for receiving a rule checking for one or more known vulnerabilities;
means for receiving a rule checking for a cost to implement one or more specific objects in the one or more objects;
means for receiving a rule checking for a percentage of a license that has been used, a percentage of a license that has been not been used, or a practicable combination thereof;
means for receiving a rule checking for a newer version of cloud management software;
means for receiving a rule checking if a usage quota has been exceeded, the usage quota has not been exceeded, or a practicable combination thereof;
means for receiving a rule checking for missing tags, present tags, or a practicable combination thereof;
means for receiving a rule checking for compliance with one or more compliance parameters for a server;
means for receiving a rule checking for compliance with one or more compliance parameters for the workload; or
a practicable combination thereof.

12. The apparatus of claim 7, wherein the response comprises one or more of:
a user-defined response;
storing the data describing the one or more objects;
changing one or more configurations of one or more computing resources;
sending one or more text messages, e-mails, or a practicable combination thereof to a user;
applying a patch;
determining that a patch is not to be applied;
moving the workload from the one or more cloud computing platforms to a different cloud computing platform;
powering down of a virtual machine;
powering up of a virtual machine;
stopping execution of an action; or
a practicable combination thereof.

13. An apparatus, comprising:
a processor; and
a memory coupled to the processor and configured to cause the processor to create specific logic circuits within the processor, wherein the specific logic circuits are configured to cause the processor to:
determine an instance of a workload to be run on one or more cloud computing platforms;
identify one or more objects on the one or more cloud computing platforms to be used by the one or more cloud computing platforms to run the instance of the workload;
receive data describing one or more actual configurations of the one or more objects;

receive one or more rules restricting a use of the one or more objects; objects to one or more required configurations;

search for one or more violations of the one or more rules by comparing the one or more actual configurations to the one or more required configurations;

execute, in response to one or more identifications of the one or more violations, a response to the one or more violations that changes the one or more actual configurations of the one or more objects on the one or more cloud computing platforms to the one or more required configurations; and cause the one or more cloud computing platforms to run the instance of the workload with the one or more objects in the one or more required configurations.

14. The apparatus of claim 13, wherein the processor is configured to identify the one or more objects by:

querying one or more respective cloud management platforms of the one or more cloud computing platforms for an identification of the one or more objects being used on the respective one or more cloud computing platforms;

retrieving the identification of the one or more objects being used from a database storing a record of user activities; or a practicable combination thereof.

15. The apparatus of claim 13, wherein the processor is configured to receive the data by:

querying the one or more cloud computing platforms for the data;

querying a database for the data, wherein the database is independent of the one or more cloud computing platforms;

storing the data in the database; or a practicable combination thereof.

16. The apparatus of claim 13, wherein the data describing the one or more objects include:

user-defined data,
historical data,
real-time data,
one or more configuration details of a server,
one or more configuration parameters for the workload,
one or more configuration details of a virtual network,
one or more configuration details of a virtual machine,
one or more configuration details of an operating system,
one or more configuration details of software,
one or more configuration details of hardware,
one or more configuration details of a cluster,
one or more configuration details of a network,
one or more details of a remote script,
one or more details of a pod of containers,
one or more details of a load balancer, or
a practicable combination thereof.

17. The apparatus of claim 13, wherein the processor is configured to receive the one or more rules by:

receiving a user-defined rule;

receiving one or more descriptions of what one or more specific objects in the one or more objects includes, excludes, or a practicable combination thereof;

receiving a rule checking for a permitted geographic location of a given workload, a prohibited geographic location of a given workload, or a practicable combination thereof;

receiving a rule checking for one or more known vulnerabilities;

receiving a rule checking for a cost to implement one or more specific objects in the one or more objects;

receiving a rule checking for a percentage of a license that has been used, a percentage of a license that has been not been used, or a practicable combination thereof;

receiving a rule checking for a newer version of cloud management software;

receiving a rule checking if a usage quota has been exceeded, the usage quota has not been exceeded, or a practicable combination thereof;

receiving a rule checking for missing tags, present tags, or a practicable combination thereof;

receiving a rule checking for compliance with one or more compliance parameters for a server;

receiving a rule checking for compliance with one or more compliance parameters for the workload; or a practicable combination thereof.

18. The apparatus of claim 13, wherein the response comprises one or more of:

a user-defined response;

storing the data describing the one or more objects;

changing one or more configurations of one or more computing resources;

sending one or more text messages, e-mails, or a practicable combination thereof to a user;

applying a patch;

determining that a patch is not to be applied;

moving the workload from the one or more cloud computing platforms to a different cloud computing platform;

powering down of a virtual machine;

powering up of a virtual machine;

stopping execution of an action; or a practicable combination thereof.

19. A non-transitory computer-readable medium, comprising:

processor-executable instructions stored thereon configured to cause a processor to:

determine an instance of a workload to be run on one or more cloud computing platforms;

identify one or more objects on the one or more cloud computing platforms to be used by the one or more cloud computing platforms to run the instance of the workload;

receive data describing one or more actual configurations of the one or more objects;

receive one or more rules restricting a use of the one or more objects; objects to one or more required configurations;

search for one or more violations of the one or more rules by comparing the one or more actual configurations to the one or more required configurations;

execute, in response to one or more identifications of the one or more violations, a response to the one or more violations that changes the one or more actual configurations of the one or more objects on the one or more cloud computing platforms to the one or more required configurations; and cause the one or more cloud computing platforms to run the instance of the workload with the one or more objects in the one or more required configurations.

20. The non-transitory computer-readable medium of claim 19, wherein the processor-executable instructions configured to cause the processor to identify the one or more objects further comprises processor-executable instructions configured to cause the processor to:

query one or more respective cloud management platforms of the one or more cloud computing platforms for an identification of the one or more objects being used on the respective one or more cloud computing platforms;
retrieve the identification of the one or more objects being used from a database storing a record of user activities; or
a practicable combination thereof.

21. The non-transitory computer-readable medium of claim 19, wherein the processor-executable instructions configured to cause the processor to receive the data further comprises processor-executable instructions configured to cause the processor to:
query the one or more cloud computing platforms for the data;
query a database for the data, wherein the database is independent of the one or more cloud computing platforms;
store the data in the database; or
a practicable combination thereof.

22. The non-transitory computer-readable medium of claim 19, wherein the data describing the one or more objects include:
user-defined data,
historical data,
real-time data,
one or more configuration details of a server,
one or more configuration parameters for the workload,
one or more configuration details of a virtual network,
one or more configuration details of a virtual machine,
one or more configuration details of an operating system,
one or more configuration details of software,
one or more configuration details of hardware,
one or more configuration details of a cluster,
one or more configuration details of a network,
one or more details of a remote script,
one or more details of a pod of containers,
one or more details of a load balancer, or
a practicable combination thereof.

23. The non-transitory computer-readable medium of claim 19, wherein the processor-executable instructions configured to cause the processor receive the one or more rules further comprises processor-executable instructions configured to cause the processor to:
receive a user-defined rule;
receive one or more descriptions of what one or more specific objects in the one or more objects includes, excludes, or a practicable combination thereof;
receive a rule checking for a permitted geographic location of a given workload, a prohibited geographic location of a given workload, or a practicable combination thereof;
receive a rule checking for one or more known vulnerabilities;
receive a rule checking for a cost to implement one or more specific objects in the one or more objects;
receive a rule checking for a percentage of a license that has been used, a percentage of a license that has been not been used, or a practicable combination thereof;
receive a rule checking for a newer version of cloud management software;
receive a rule checking if a usage quota has been exceeded, the usage quota has not been exceeded, or a practicable combination thereof;
receive a rule checking for missing tags, present tags, or a practicable combination thereof;
receive a rule checking for compliance with one or more compliance parameters for a server;
receive a rule checking for compliance with one or more compliance parameters for the workload; or
a practicable combination thereof.

24. The non-transitory computer-readable medium of claim 19, wherein the response comprises one or more of:
a user-defined response;
storing the data describing the one or more objects;
changing one or more configurations of one or more computing resources;
sending one or more text messages, e-mails, or a practicable combination thereof to a user;
applying a patch;
determining that a patch is not to be applied;
moving the workload from the one or more cloud computing platforms to a different cloud computing platform;
powering down of a virtual machine;
powering up of a virtual machine;
stopping execution of an action; or
a practicable combination thereof.

* * * * *